United States Patent [19]

Shiao et al.

[11] Patent Number: 5,415,817
[45] Date of Patent: May 16, 1995

[54] PROCESS FOR MOLDING PLASTIC LENSES

[75] Inventors: Po-Ling Shiao, Hsinchu; Chien-Tsung Wu, Taichung Hsien; Chi-Shen Tuan; Tzong-Ming Yeh, both of Taipei, all of Taiwan, Prov. of China

[73] Assignee: Industrial Technology Research Institute, Hsinchu, Taiwan, Prov. of China

[21] Appl. No.: 141,136

[22] Filed: Oct. 22, 1993

[51] Int. Cl.⁶ .............................................. B29D 11/00
[52] U.S. Cl. ................................... 264/2.2; 264/328.7; 264/328.9; 264/328.12; 425/555; 425/808
[58] Field of Search ...................... 264/2.2, 2.5, 328.7, 264/328.9, 328.12; 425/808, 810, 555

[56] References Cited

U.S. PATENT DOCUMENTS

| | | | |
|---|---|---|---|
| 4,184,835 | 1/1980 | Talbot | 425/808 |
| 4,284,591 | 8/1981 | Neefe | 264/2.2 |
| 4,540,534 | 9/1985 | Grendol | 264/2.2 |
| 4,664,854 | 5/1987 | Bakalar | 264/2.2 |

FOREIGN PATENT DOCUMENTS

| | | | |
|---|---|---|---|
| 54-148055 | 11/1979 | Japan | 264/2.2 |
| 62-35823 | 2/1987 | Japan | 425/808 |
| 63-94807 | 4/1988 | Japan | 264/2.2 |
| 3-9824 | 1/1991 | Japan | 425/810 |

*Primary Examiner*—Mathieu D. Vargot
*Attorney, Agent, or Firm*—W. Wayne Liauh

[57] ABSTRACT

An improved injection/compression molding process for the manufacturing of high quality concave optical lenses of thin thickness. A thermoplastic material is injected into a mold cavity of an injection/compression molding machine, the mold cavity is designed to have adjustable thickness and is initially set at a thickness greater than the lens to be produced. After the amount of the plastic injected fills the enlarged cavity, the thickness of the cavity is gradually reduced by exerting a compressional force on the thermoplastic material inside the mold cavity. During the compression stage, the injection continues and the excess thermoplastic material is squeezed into an overflow pocket inside the injection/compression mold. The injection apparatus can be switched into a pressure holding mode during and after the compression stage to prevent any backflow and post-injection shrinkage. The process disclosed in the present invention offers many significant advantages over prior art processes, including avoidance of the commonly encountered weld line and birefrigence problem, substantially improved quality control, elimination of external heating or cooling needs, increased production rate, and reduced production cost.

18 Claims, 2 Drawing Sheets

PROCESS FOR MOLDING PLASTIC LENSES

FIELD OF INVENTION

This invention relates to a process for making plastic lenses which have a thin central portion and a thick annular portion. More particularly, this invention relates to an improved injection molding process for making high quality concave lenses with relatively thin thickness.

BACKGROUND OF THE INVENTION

Various processes involving Injection molding have been disclosed in the prior art for the fabrication of plastic lenses. In a typical process for the injection-molding of plastic lenses, plastic resins, such as polycarbonate (PC) or polymethylmethacrylate (PMMA), are initially heated to a molten state. Then, the molten plastic is injected into a mold cavity so that it assumes the compensated form of the mold cavity when it cools. Empirically, good lens quality is achievable if the injection molding process is used in the production of relatively thick lenses (including both the concave lenses and convex lenses). However, it has not been successful to use the injection molding process to fabricate high-quality relatively thin lenses, particularly, thin concave lenses.

A mold cavity for the fabrication of concave lenses has a relatively thinner central portion and a relatively thicker annular portion (i.e., the annular portion is thicker than the central portion). During the conventional injection-molding process, the molten plastic flows through the annular portion of the molding cavity at a greater linear speed than the speed by which it flows through the central portion of the same. As a consequence, the molten plastic diverges into two melt fronts (leading tips of the molten plastic) along the annular portion of the mold cavity. When the two melt fronts meet at a seam, a weld (knit) line is formed on the surface of the lens being formed. For plastic concave lenses having the same diameters, the higher the degree of the concave lens, the longer the weld line of the concave lens would become. The weld line is formed because the melt fronts of the molten plastic cool and thus at least partially solidify when they flow towards each other. The solidification prevents the two meltfronts to satisfactorily merge with each other. One way to solve this problem is to externally apply heat to the mold to maintain the mold at a temperature such that the viscosity of the plastic is retained at a minimum. However, this introduces another problem in that this process would require a relatively longer period of time for the molten plastic to cool and solidify. As a consequence, the plastic lenses cannot be produced at high rates using the conventional injection-molding process.

Another way to alleviate the above-mentioned problem is to compression-mold blanks of lenses (i.e., precursory lenses) into finished lenses. A typical process for compression-molding of plastic lenses employs a mold having a sleeve and two inserts (dies) slidably mounted in the sleeve. The confronting tips of the inserts define the compensated form of the surfaces of the lens to be manufactured. The sleeve has a tubular inner wall. A mold cavity is defined by the confronting tips of the inserts and the inner wall of the sleeve. The blanks are preheated to their melting temperature and placed inside the mold cavity. The inserts are moved towards each other so as to compress the blanks. The blanks, after compression, assume the compensated form of the mold cavity. However, since it is difficult to prepare blanks having exactly the same amount of plastic material required for making the desired lens, it is difficult to have finished lenses having exactly the desired dimensions. The conventional process requires that the mold to be maintained at or near the glass transition temperature of the plastic being molded so that the molten plastic is maintained in a viscous form. Because of the accompanying low heat transfer coefficients associated with the highly viscous material, it takes a long period of time for the plastic to cool and solidify. Consequently, with the conventional compression-molding process, the lenses also cannot be produced at satisfactorily high rates.

There have been several attempts in the industry to combine injection molding and compression molding for the production of plastic lenses. U.S. Pat. No. 4,091,057 issued to Hermann P. Weber on 23 May 1978 teaches a method for the injection molding of plastic lenses. This method employs a mold having at least an upper inner block defining a hole, a lower inner block defining another hole, an upper insert slidably mounted in the upper inner block, a lower insert slidably mounted in the lower block, several heating rods mounted about the upper and lower inner blocks, and a heating rod axially mounted in the lower insert. The confronting tips of the inserts define the compensated form of the surfaces of the lens to be produced. Each of the upper and lower inner blocks defines a tubular inner wall. The confronting tips of the upper and lower inserts and the inner walls of the upper and lower inner blocks define a mold cavity having a central portion and an annular portion having a thickness greater than the central portion. The lower inner block also defines an inlet in communicating with the hole formed in the same. The lower inner block also defines an overflow passageway, by means of which the hole formed in the lower inner block can be communicated to an overflow pocket formed in the lower inner block. A piston is slidably received in the overflow pocket and biased by a spring attached to the mold so that the volume of the overflow pocket is adjustable. A thermoplastic material is heated to a temperature of 520°–560° F. so that it is molten in order to be injected into the mold cavity, which is heated to a temperature of 260°–275° F. by means of the heating rods. The force of the molten plastic against the upper insert causes the upper insert to rise, thereby increasing the thickness of the central portion of the mold cavity. Thus, a weld line will not occur. Then, the upper insert is moved towards the lower insert in order to compress the molten plastic which is urged into the overflow pocket through the overflow passageway. In this manner finished lenses with predetermined dimensions are obtained. In the process disclosed in the '057 patent, the injection of the molten plastic material into the mold cavity is stopped before the compression of the molten plastic in the mold cavity. That is, the melt front pauses before it is urged into the overflow pocket. Birefringence thus occurs at the point wherein the melt front pauses.

U.S. Pat. No. 4,364,878 issued to Albert J. Laliberte on 21 Dec. 1982 teaches a method for molding ophthalmic lenses. Such a method employs a mold having two sleeves and two mold inserts slidably mounted in the sleeves. The sleeves each define a tubular inner wall. The confronting tips of the mold inserts define the compensated form of the surfaces of the lenses to be manufactured. The confronting tips of the mold inserts and the inner walls of the sleeves define a compressible mold cavity. Initially, the mold inserts are positioned at an extended distance from each other so that the mold cavity is greater than in volume than the desired lenses. Then, molten plastic is injected into the mold cavity. Thereafter, the mold inserts are moved to an appropriate distance from each other so that the mold has exactly the compensated form of the desired lenses. Finally, the lenses are cooled and allowed to solidify and assume the shape which is the compensated form of the mold cavity. With the method disclosed in the '878 patent, the amount of plastic injected into the mold cavity must be exactly the same as the amount of plastic required for the desired lenses, as the mold does not define any overflow cavity. This requires a measuring device for ensuring that exactly the amount of molten plastic is injected into the mold cavity. To satisfy this requirement, molten plastic is injected into the mold cavity from a reservoir through the measuring device. The measuring device must be heated so as to maintain the molten plastic at a certain temperature so that the molten plastic is retained at a certain viscosity in the measuring device in order for the measuring device to properly function. Therefore, this process requires more energy. Furthermore, it takes a longer period of time as it involves the extra steps of measuring the quantity of the molten plastic. It takes an even longer period of time as it involves a long travel of the molten plastic and birefringence also occurs as a consequence.

U.S. Pat. No. 4,836,960 issued to David P. Spector et al. on 6 Jun. 1989 teaches a fabrication of plastic optical components by injection/compression molding. The fabrication process disclosed in the '960 patent employs a mold having a sleeve and two mold dies slidably mounted in the sleeve. The sleeve defines a tubular wall. The confronting tips of the mold dies define the compensated form of the surfaces of the desired lenses. The inner wall of the sleeve and the confronting tips of the mold dies define a compressible mold cavity. Initially, the assembly is heated to a temperature above the glass transition temperature of the thermoplastic material to be molded. An injection port extends through the sleeve to the bore, and is positioned to inject the thermoplastic material that has been heated to a liquid state into the cavity. After injection of the thermoplastic material, the mold inserts are moved toward each other to compress the thermoplastic material, while excess thermoplastic material is forced out of the mold cavity. The molds are then turned in a reverse direction to uncouple the injection port from the cavity. The assembly is then cooled to a temperature below the glass transition temperature of the thermoplastic material. Finally, the lens is removed from the mold. The method disclosed in the '960 patent has the disadvantage that, because it requires both the heating and cooling steps, it takes a long period of time to complete the process. Furthermore, expensive injection molding apparatus is required to practice the process disclosed therein, particularly to accommodate the heating and cooling requirements.

SUMMARY OF INVENTION

Having discussed the shortcomings of the prior art processes for the production of plastic lenses, the primary object of the present invention, therefore, is to provide an improved process that will allow high quality plastic lenses to be made in a simplified manner and with substantially reduced capital as well as operation costs including energy savings. More particularly, the primary object of the present invention is to provide an injection/compression molding process which enables the production of relative thin concave plastic lenses to be made with reduced production time and cost, and without the occurrence of birefrigence, and/or the need for expensive external heating or cooling requirement.

In the injection/compression molding process disclosed in the present invention, a thermoplastic material is injected into a compression molding having a cavity similar to but greater in volume than the lenses to be produced. After the amount of injection reaches a certain level, the thermoplastic material inside the mold cavity is compressed to assume the predetermined shape of the lenses. The injection continues even after the compression commences, with the excess thermoplastic material being squeezed into an overflow pocket inside the compression molding. With the injection/compression molding process disclosed in the present invention, thin concave plastic lenses can be produced according to their exact specification without requiring an expensive measuring device and/or external heating or cooling equipment. Yet the high quality plastic optical lenses can be made with reduced production time and cost, thus this invention allows great economic benefits to be realized.

In the process disclosed in the present invention, plastic lenses having a thin central portion and thick annular portion are made by means of an injection/compression molding machine. The process comprises the following steps:

(a) obtaining an injection/compression molding machine containing a specially designed mold, the specially designed mold comprising two separate mold dies, an injection channel, at least one overflow system each comprising an overflow channel communicated with an overflow pocket of a predetermined dimension, and first and second mold closing means, at least one of the mold dies is movable towards the other mold die by the second mold-closing means;

(b) forming a molding cavity in the mold having a shape corresponding to but a thickness greater than the plastic lens by means of the first mold-closing means of the injection/compression machine, the mold cavity is in communication with an injection channel on one side and with at least one overflow system on the other side;

(c) using an injection machine to inject a thermoplastic material into the mold cavity through the injection channel and further into the overflow systems after the plastic fills the mold cavity;

(d) before the end of the injection, compressing the mold dies to reduce the thickness of the mold cavity and urge the plastic into the overflow pockets;

(e) switching the injection machine into a pressure-holding mode for reducing backflow and post shrinkage during and after compression; and (f) setting the final thickness of the mold cavity by means of a second mold-closing motion of the injection/compression molding machine and a positioning means, which is part of the design of the mold; the compressional force on the mold dies is retained until the predetermined thickness of the mold cavity is reached; the compressional on the mold dies is further retained until the lens cools below the glass transition temperature.

For a better understanding of the present invention and objects thereof, a study of the detailed description of the embodiments described hereinafter should be made in relation to the accompanying drawings.

BRIEF DESCRIPTION OF DRAWINGS

The present invention will be described in detail with reference to drawings showing the preferred embodiment of the present invention, wherein:

FIG. 1 shows a mold defining a compressible mold cavity, without plastic filling the mold cavity, in a first position at which the thickness of the mold cavity is made to be larger than the thickness of the desired lens to be produced.

DETAILED DESCRIPTION OF PREFERRED EMBODIMENT

Figure 1:
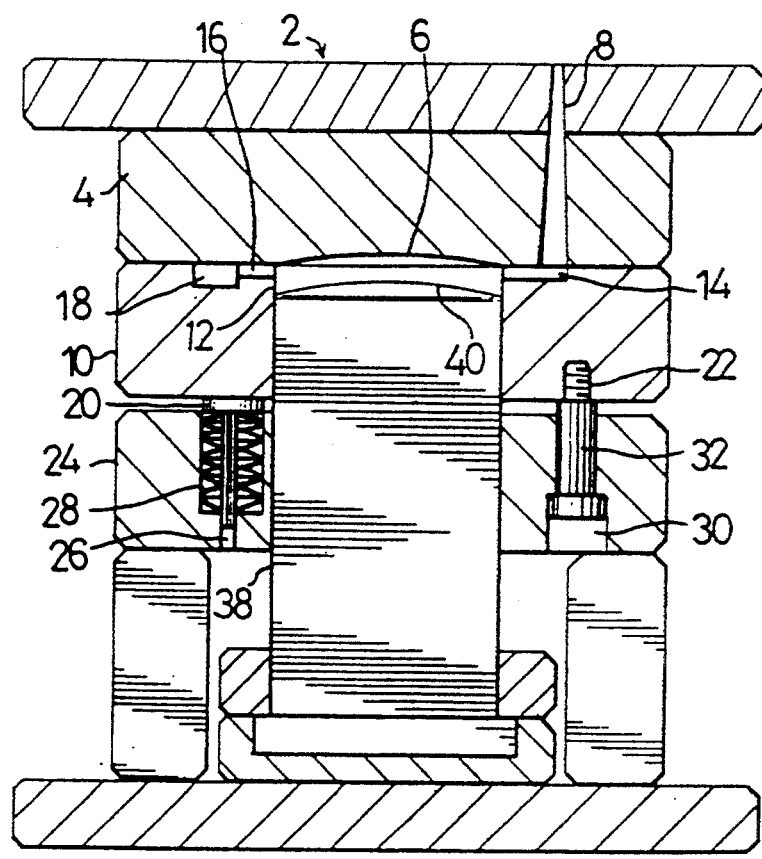
FIG. 1 is a vertical cross-sectional view of a mold for embodying the process for molding plastic lenses in accordance with a preferred mode of the present invention.
Figure 2:
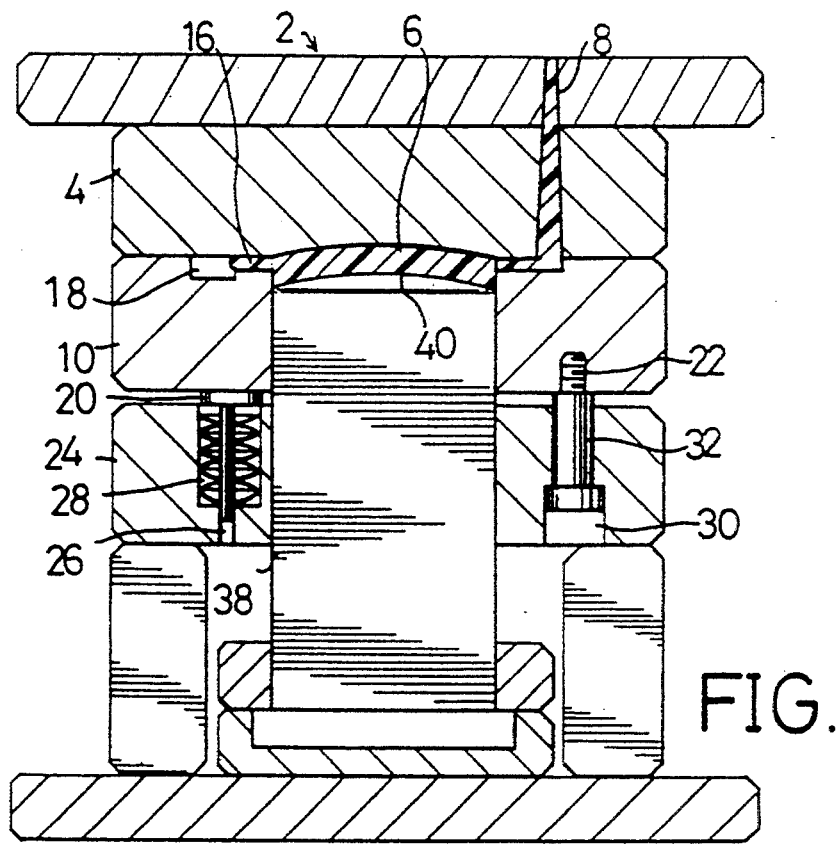
FIG. 2 is similar to FIG. 1, showing the mold cavity being filled with plastic.

Referring now to FIGS. 1 and 2 of the drawings, it is shown, a process for molding plastic lenses in accordance with a preferred embodiment of the present invention which employs a mold 2 having a mold die 4, a first sleeve 10, a second sleeve 24, and a mold insert 38.

The mold die 4 is configured as a plate having a first side and a second side. In the second side of the mold die 4, there is formed a concave surface 6 having the compensated form of the convex surface of a lens to be manufactured. A sprue 8 is formed through the mold die 4.

The first sleeve 10 defines a central hole enclosed by a tubular inner wall 12 having a diameter corresponding to that of the periphery of the lens to be produced. The first sleeve 10 has a first side and a second side. An injection channel 14 is formed in the first side of the first sleeve 10 such that the injection channel 14 is communicated with the central hole. At least one pair of overflow channel 16 and overflow pocket 18 are formed in the first side of the first sleeve 10 such that the overflow channel 16 provides the communication between the central hole and the overflow pocket 18.

A protrusion 20 has a stepped configuration having a thick section formed on the second side of the sleeve 10 and a slender section formed on the thick section. A threaded hole 22 is formed in the second side of the first sleeve 10.

The second sleeve 24 has a central hole, a hole 26 and another hole 30. The central hole is axially formed through the second sleeve 24. The hole 26 is stepped such that it has a wide section formed through the first side of the second sleeve 24 and a narrow section formed through the second side of the second sleeve 24. The hole 30 is also stepped such that it has a narrow section formed through the first side of the second sleeve 24 and a wide section formed through the second side of the second sleeve 24.

A plurality of springs 28 are provided in the wide portion of the hole 26, each having the shape of a bowl and a central hole portion. The springs 28 are mounted inside the wide section of the hole 26. If so desired a single compression coil spring (not shown) can be used in the place of the plurality of springs 28.

A bolt 32 in provided to join the first insert 10 and the second insert 24 which has a threaded tip, a shank and a head. The narrow section of the hole 30 is marginally larger than the shank of the bolt 32. The wide section of the hole 30 is marginally larger than the head of the bolt 32.

To assemble the mold, the second side of the first sleeve 10 is disposed against the first side of the second sleeve 24. The threaded tip of the bolt 32 in inserted through the hole 30 to engage the threaded hole 22. At that instant, the shank of the bolt 32 is slidably received in the slender section of the hole 30, and the head of the bolt 32 in the wider section of the hole 30. The length of the shank of the bolt 32 is longer than the length of the slender section of the hole 30 so that the first sleeve 10 is movable with respect to the second sleeve 24 within a limited range. At that instant, the slender section of the protrusion 20 is inserted into the narrow section of the hole 26 through the springs 28.

The mold insert 38 has a convex tip 40 which assumes the compensated form of the concave surface of the lens to be produced. The mold insert 38 is axially slidably received within the inside walls of the first and second sleeves 10 and 24. A compressible mold cavity is thus defined by means of a the concave surface 6, the inner wall 12 and the convex tip 40.

Initially, the mold die 4 is firmly retained against the first sleeve 10, which is biased away from the second sleeve 24 by means of the springs 28. The sprue 8 is aligned with the injection channel 14, accordingly, the sprue 8 is communicated with the mold cavity. The mold insert 38 is disposed at an extended distance from the mold die 4, i.e., the mold cavity is thicker than the lenses to be produced.

Referring now to FIG. 2 of the drawings, it is shown that, as the mold cavity is sufficiently thick, the molten plastic can be easily injected into the mold cavity without forming any weld line. It is preferred that exactly the same amount required for filling the volume of the enlarged cavity is injected into the mold cavity so that shrinkage will not occur on the lenses at a later stage. The compression of the molten plastic into the mold cavity begins when the melt front of the molten plastic reaches the overflow channel 16 and the overflow pocket 18. The molten plastic essentially fully fills the mold cavity, but only partially or slightly fill the overflow pocket 18.

Figure 3:
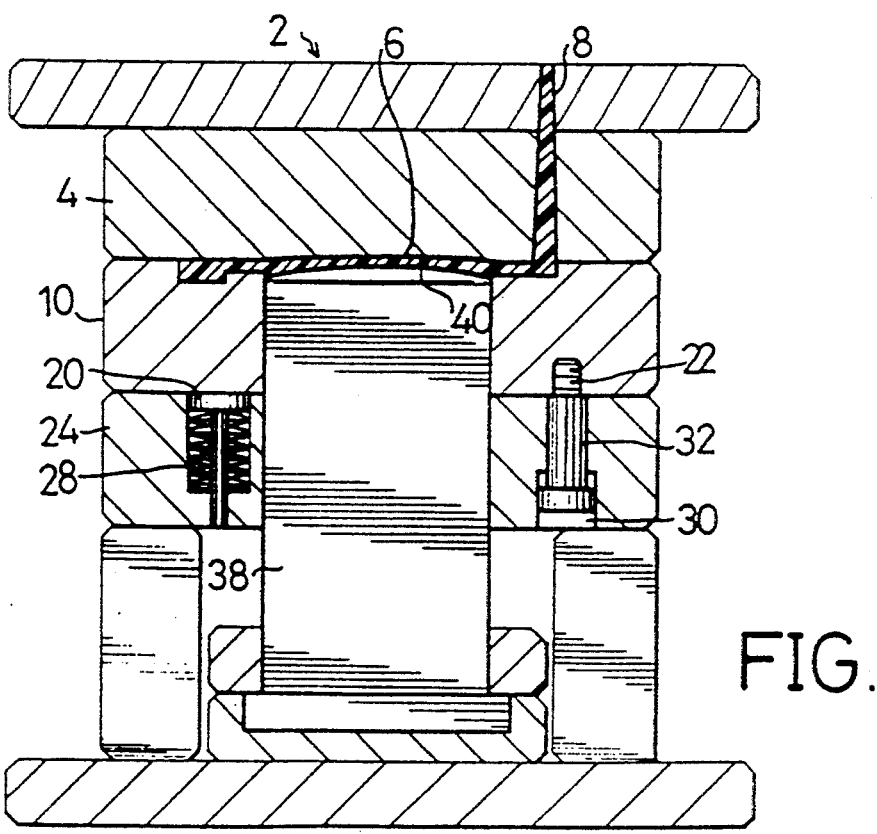
FIG. 3 is similar to FIG. 2, showing the mold cavity being compressed to a second position such that the mold cavity is identical to the desired lenses in size.

Referring now to FIG. 3 of the drawings, it is shown that the mold die 4 has been moved towards the mold insert 38, until the mold cavity is reduced and becomes as thick as the desired lenses. The molten plastic is compressed between the concave surface 6 and the convex surface 40 such that some of the plastic is urged through the overflow channel 16 into the overflow pocket 18.

In accordance with this invention, the motion of the mold die 4 towards the mold insert 38 starts before the injection of the molten plastic into the mold cavity is stopped so that the melt front will never have to pause during the injection/compression process. This alleviates the problem of birefringence which might occur in the lens at the point where the melt front is allowed to pause. Shrinkage on the rim of lens can be further controlled if necessary by utilizing a pressure-holding process of a conventional injection. Since the compression step commences before the injection stops, the process of the present invention requires a substantially shorter period of time to complete the compression process. As a consequence, the temperature of the molten plastic can be maintained at an appropriate range such that the viscosity of the molten plastic can be maintained within an appropriate range without receiving heat from the mold 2, Therefore, no externally applied heat source is necessary for the process disclosed in the present invention. In an embodiment of the present invention, the mold 2 is maintained at 80° C.–100° C. during the compression process which is lower than the temperature required for conventional molding processes which are typically at 130° C.–150° C. Because the present invention allows the production to be operated at a substantially lower temperature, it takes a shorter period of time for the lenses to cool and solidify. Therefore, lenses can be molded at an overall higher rate by means of the process in accordance with this invention.

Figure 4:
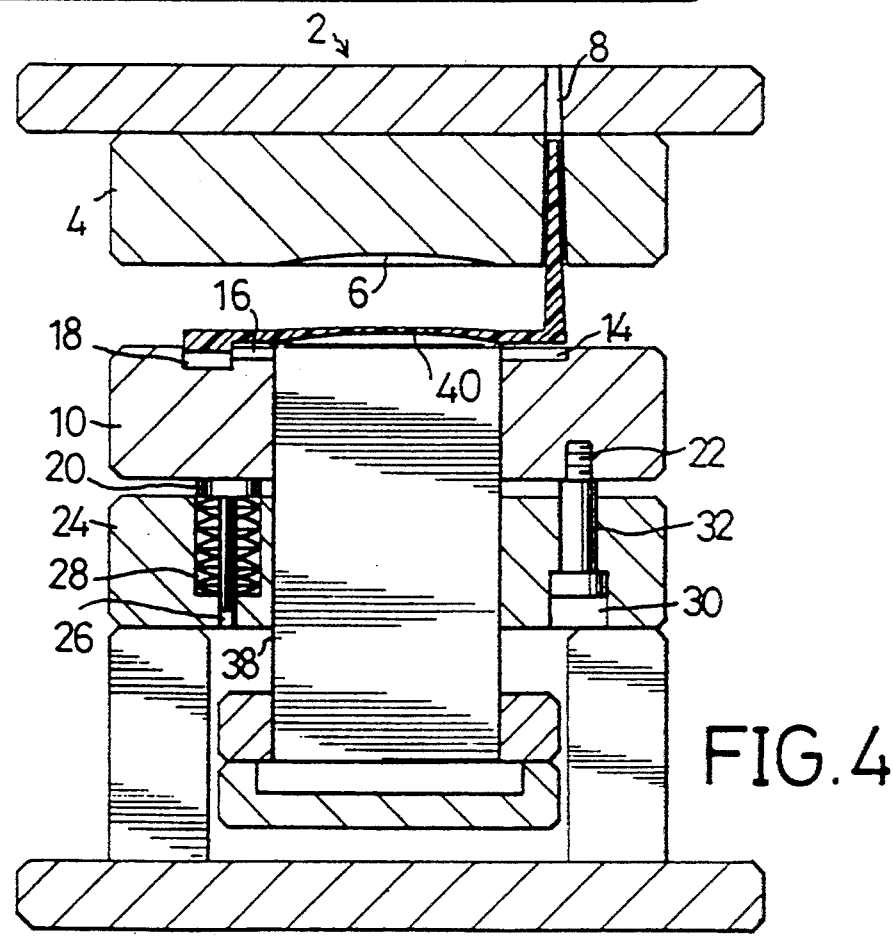
FIG. 4 is similar to FIG. 3, showing the mold cavity being opened for releasing the lens being produced.

Referring to FIG. 4 of the drawings, after the injection/compression process is completed, the mold die 4 is moved away from the first sleeve 10. The first sleeve 10 is again moved away from the second sleeve 24 by means of the springs 28. Thus, the lens is moved away from the convex tip 40 by means of the first sleeve 10. The mold insert 38 is then moved towards the mold die 4 so that the lens is disengaged from the first sleeve 10 by means of the convex tip 40.

Lenses with different optical surfaces can be molded by employing mold dies with different concave surfaces and mold inserts with different convex tips.

In accordance with this invention, the overflow channel 16 should preferably be sufficiently small so that the molten plastic will fill the mold cavity before it enters the overflow pocket 18, yet it should be sufficiently large so that the molten plastic can easily flow into the overflow pocket 18 when it is compressed. The overflow pocket 18 must be located far from the sprue 8. The volume of the overflow pocket 18 must be sufficiently large to receive the overflowing plastic, yet it must not be too large in order not to produce flash. This can be calculated by a computer aided flow analysis simulation program. The thickness of the overflow pocket 18 should not exceed the maximum thickness of a lens to be molded, so that shrinkage will not occur on the portion of the lens near the overflow channel 16. The overflow pocket 18 is dimensioned in such a manner that it will be filled with the molten plastic after completion of the compression step; in other words, the amount of molten plastic injected equals the volume of the volume of the molded lens plus the volume of the overflow pocket.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. A process for making plastic lens using an injection/compression molding machine, said injection/compression molding machine having a mold capable of forming a mold cavity with adjustable thickness, and said process comprising the following steps:
    (a) forming a mold cavity in said mold with enlarged thickness, said mold cavity has a shape similar to but greater in thickness than said plastic lens to be made, and said mold cavity is adapted to be in communication with both an injection channel and an overflow pocket both are formed in said injection/compression machine;
    (b) injecting a molten plastic material into said mold cavity through said injection channel while allowing a portion of said molten plastic material to flow into said overflow pocket after said plastic material fills said mold cavity;
    (c) without stopping injection of said molten plastic material, applying a compression means on said molten plastic material in said mold cavity to reduce thickness of said mold cavity, said compression means continues until a predetermined thickness is reached;
    (d) cooling said plastic material to cause solidification thereof and form said plastic lens; and
    (e) removing said plastic lens from said injection/compression machine.

2. The process for making plastic lens of claim 1 further comprises the step of applying an external pressure on said plastic lens in said molding cavity via said injection channel to prevent backflow and/or shrinkage thereof during said cooling step.

3. A process for molding plastic lens comprising the following steps:
    (a) obtaining an injection/compression molding machine, said injection/compression molding machine having a mold comprising two opposing mold dies, said mold dies having compensating surfaces relative to two major surfaces respectively of said plastic lens to be produced, at least one of said mold dies being movable toward the other, a cavity forming means associated with said two opposing mold dies for forming a mold cavity of variable thickness, an injection means for injecting a thermoplastic material into said mold cavity via an injection channel, a compression means associated with movement of said at least one movable mold die for exerting a compressional force on said thermoplastic material and reducing thickness of said mold cavity, and at least one overflow pocket each in communication with said mold cavity via an overflow channel;
    (b) forming an enlarged mold cavity having a thickness greater than said lens to be produced;
    (c) injecting said thermoplastic material into said enlarged mold cavity via said injection channel and further into said overflow pocket after said thermoplastic material fills said enlarged mold cavity;
    (d) before end of injecting step (c), compressing said thermoplastic material in said mold cavity by moving said movable mold die toward the other to reduce thickness of said mold cavity and urge excess part of said thermoplastic material into said overflow pockets until a predetermined thickness of said mold cavity is reached;
    (e) maintaining a compressional force on said mold dies until said lens cools to below its glass transition temperature.

4. The process for molding plastic lens in accordance with claim 3, wherein said cavity forming means comprises said two opposing mold dies and a sleeve assembly, said sleeve assembly having a center hole for slidably receiving one of said mold dies.

5. The process for molding plastic lens in accordance with claim 4, wherein said mold die inside said sleeve assembly is stationary and the other mold die is movable, and said compression means comprises movement of said movable mold die toward said stationary mold die.

6. The process for molding plastic lens in accordance with claim 5, wherein said sleeve assembly comprises first and second sleeve members, said first sleeve member being closer to said movable mold die and axially movable relative to said second sleeve member.

7. The process for molding plastic lens in accordance with claim 6, wherein said sleeve assembly further comprises a biasing means for biasing said first sleeve member away from said second sleeve member to create said enlarged mold cavity.

8. The process for molding plastic lens in accordance with claim 7, wherein said biasing means comprises at least one spring member and a protrusion member received by said spring member.

9. The process for molding plastic lens in accordance with claim 6, wherein said sleeve assembly further comprises a positioning means for controlling initial or final thickness, or both, of said mold cavity.

10. The process for molding plastic lens in accordance with claim 9, wherein said positioning means comprises a bolt threaded or otherwise affixed into said first sleeve member through a stepped hole in said second sleeve member, said bolt has a threaded section, a slender shank and a wide head, said stepped hole having a narrower section closer to said first sleeve member and a wider section away from said first sleeve member, said shank having a diameter similar to said narrower section of said stepped hole but with a longer length, thus allowing said first sleeve member to move relative to said second sleeve member within a distance which is the difference between said shank and said narrower section of said stepped hole.

11. The process for molding plastic lens in accordance with claim 3, wherein said overflow channel is so dimensioned such that said thermoplastic material will fill said mold cavity before it flows into said overflow pocket, yet it is sufficiently large to allow said thermoplastic material to flow into said overflow pocket when compressed.

12. The process for molding plastic lens in accordance with claim 3, wherein said overflow pocket is so dimensioned such that it has adequate volume to receive said thermoplastic material during compression but without causing flashing.

13. The process for molding plastic lens in accordance with claim 3, wherein said thermoplastic material is injected in an amount equaling the volume of said enlarged mold cavity so that said thermoplastic material fills said enlarged mold cavity without forming any weld line and begins to enter the overflow systems before the compression takes place.

14. The process for molding plastic lens in accordance with claim 3, wherein said overflow pocket is dimensioned in such a manner that it will be filled with said thermoplastic material after completion of said compression step.

15. The process for molding plastic lens in accordance with claim 3 wherein said process is conducted at a mold temperature substantially lower than the glass transition temperature of said thermoplastic material.

16. The process for molding plastic lens in accordance with claim 3 which further comprises the step of switching said injection means into a pressure-holding mode for restraining back flow and shrinkage of the lens.

17. The process for molding plastic lens in accordance with claim 1 wherein the amount of said thermoplastic material injected equals the volume of said plastic lens plus the volume of said overflow pocket.

18. The process for molding plastic lens in accordance with claim 4 wherein the amount of said thermoplastic material injected equals the volume of said plastic lens plus the volume of said overflow pocket.

* * * * *